United States Patent [19]

Wreede et al.

[11] Patent Number: 5,499,118
[45] Date of Patent: Mar. 12, 1996

[54] SYSTEM FOR COPYING MULTIPLE HOLOGRAMS

[75] Inventors: John E. Wreede, Azusa; James E. Scott, Hermosa Beach; David D. Tanaka, Downey, all of Calif.

[73] Assignee: Hughes Aircraft Company, Los Angeles, Calif.

[21] Appl. No.: 298,811

[22] Filed: Aug. 31, 1994

[51] Int. Cl.$^6$ ............................ G03H 1/20; G03H 1/26; G03H 1/28
[52] U.S. Cl. ........................ 359/12; 359/22; 359/24
[58] Field of Search ................................ 359/12, 22, 24, 359/25

[56] References Cited

U.S. PATENT DOCUMENTS

| | | | |
|---|---|---|---|
| 3,758,186 | 9/1973 | Brumm | 359/12 |
| 4,984,856 | 1/1991 | Moss et al. | 359/12 |
| 5,327,266 | 7/1994 | Mulder et al. | 359/24 |

FOREIGN PATENT DOCUMENTS

| | | | |
|---|---|---|---|
| 58-187982 | 11/1983 | Japan | 359/12 |
| 2-109086 | 4/1990 | Japan | 359/12 |
| 2-244086 | 9/1990 | Japan | 359/12 |

*Primary Examiner*—Martin Lerner
*Attorney, Agent, or Firm*—Leonard A. Alkov; W. K. Denson-Low

[57] ABSTRACT

A hologram copying system that includes a first reconstruction beam, a second reconstruction beam that is incoherent with respect to the first reconstruction beam, a first master hologram responsive to the first reconstruction beam for producing a first diffracted beam, a second master hologram responsive to the second reconstruction beam for producing a second diffracted beam, and a holographic recording layer responsive to the first and second reconstruction beams and the first and second diffracted beams, whereby a first hologram is formed by interference of the first reconstruction beam and the first diffracted beam, and a second hologram is formed by interference of the second reconstruction beam and the second diffracted beam.

8 Claims, 2 Drawing Sheets

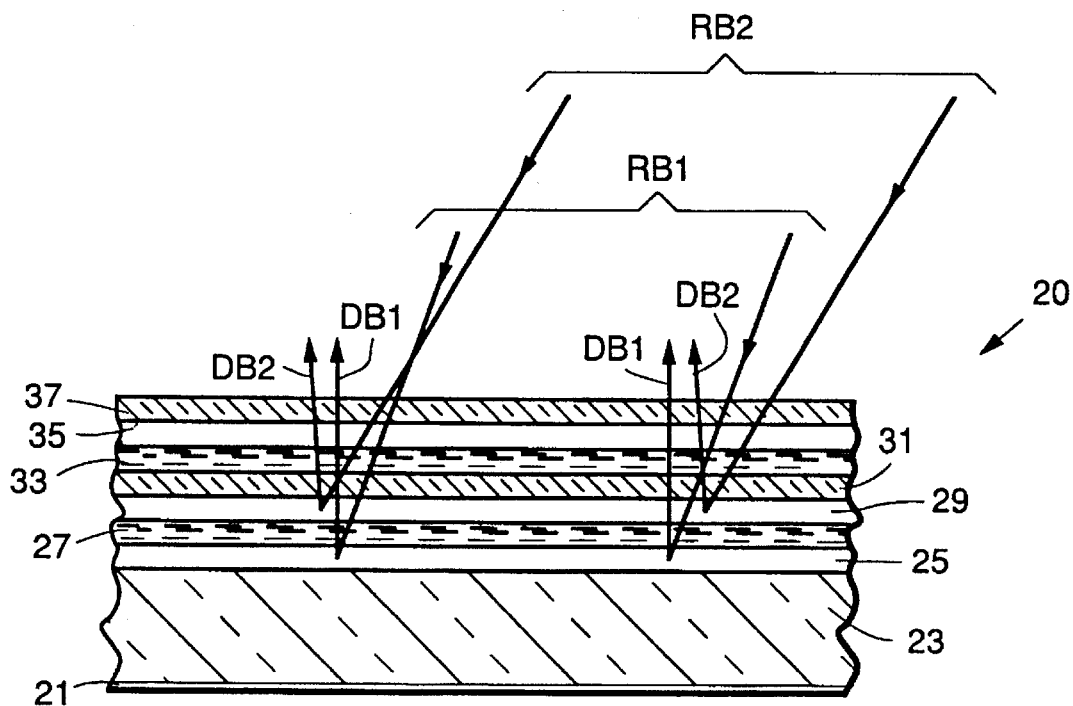
FIG. 1.
FIG. 2.
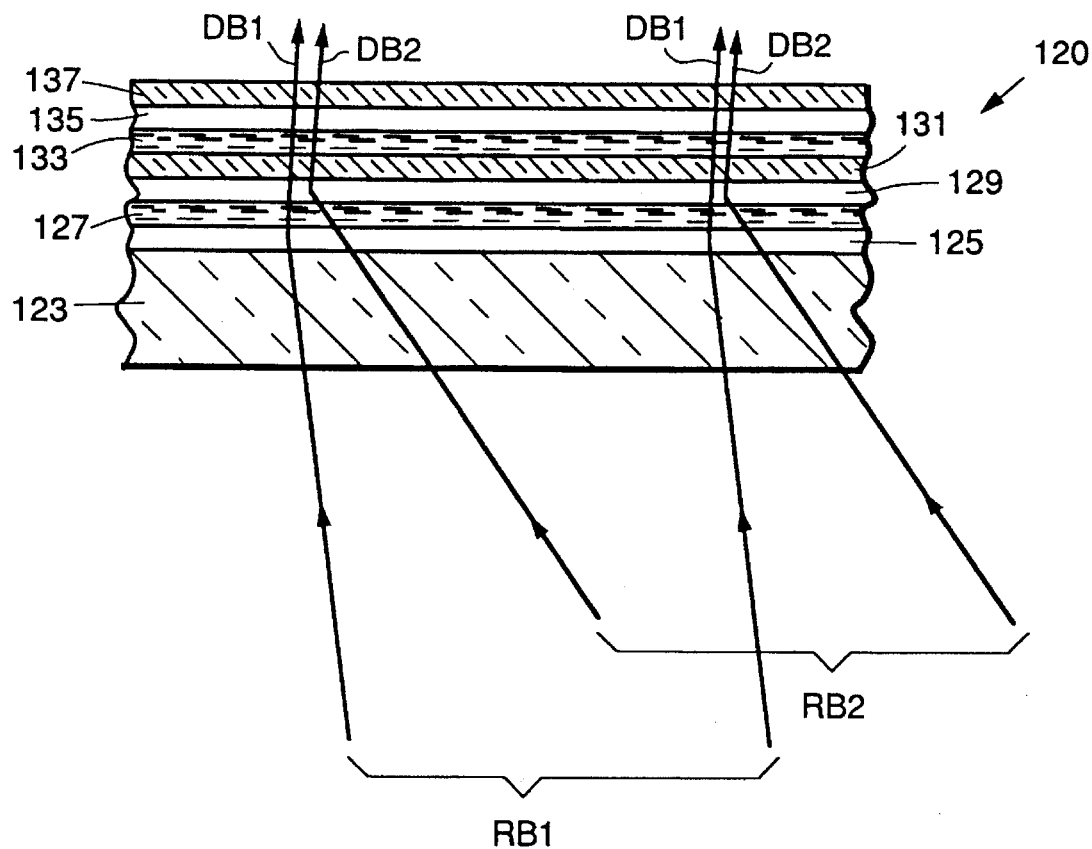

SYSTEM FOR COPYING MULTIPLE HOLOGRAMS

BACKGROUND OF THE INVENTION

The subject invention is generally directed to copying holograms, and more particularly to a technique for simultaneous copying of two holograms into a single hologram recording layer.

In a number of applications such as laser eye protection and head-up displays, it may be desirable to utilize a hologram structure that has a bandwidth that is greater than that typically available from a single hologram. One approach to achieving a wider bandwidth hologram is to utilize a hologram structure having two holograms, and it would generally appear that the two holograms can be in the same hologram recording layer, or they can be in different layers that are individually exposed and later laminated.

However, recording two holograms in a single recording layer presents various problems. If the holograms are exposed simultaneously, interaction between respective sets of exposure beams (i.e., interaction of any beam from one set with any beam from another set) will produce undesirable crosstalk holograms that would reconstruct at unacceptably high intensities. Recording the two overlapping holograms in a single recording layer pursuant to sequential exposures can be performed with dichromated gelatin (DCG) and silver halide recording materials without significant degradation, but not with a photopolymer. A consideration with successive exposures, however, is the requirement for more handling, and for DCG a change of shrinkage factor for the subsequent exposures. While non-overlapping adjacent holograms can be successively recorded in a photopolymer, surface distortion including a ridge and/or a trough occurs around each exposure area, which might not be amenable to removal by cutting.

Recording individual holograms on respective recording layers which are later laminated together involves the extra steps and costs associated with lamination and the additional film. This approach would work for a master hologram or a small number of copies, but is inconvenient as well as uneconomical for a large number of copies.

Another approach to the need for wider bandwidth is to artificially broaden the hologram in processing to obtain a wider bandwidth or even two distinct peaks. This requires critical processing for any type of recording material.

SUMMARY OF THE INVENTION

It would therefore be an advantage to provide an improved technique of simultaneously copying two holograms in a single layer of holographic recording material without constructing undesirable crosstalk holograms.

A further advantage would be to a technique for simultaneously copy holograms in a photopolymer to reduce surface distortion at the edges of the copy holograms.

The foregoing and other advantages are provided by the invention in a hologram copying system that includes a first reconstruction beam, a second reconstruction beam that is incoherent with respect to the first reconstruction beam, a first master hologram responsive to the first reconstruction beam for producing a first diffracted beam, a second master hologram responsive to the second reconstruction beam for producing a second diffracted beam, wherein the second hologram is sufficiently separated from the first hologram in Bragg angle or color such that light utilized to reconstruct one master hologram is not diffracted by the other hologram, and a holographic recording layer responsive to the first and second reconstruction beams and the first and second diffracted beams, whereby a first hologram is formed by interference of the first reconstruction beam and the first diffracted beam, and a second hologram is formed by interference of the second reconstruction beam and the second diffracted beam.

BRIEF DESCRIPTION OF THE DRAWINGS

The advantages and features of the disclosed invention will readily be appreciated by persons skilled in the art from the following detailed description when read in conjunction with the drawing wherein:

FIG. 1 schematically depicts a hologram copy system for simultaneously copying two reflection holograms to a single hologram recording layer in accordance with the invention.

FIG. 2 schematically depicts a hologram copy system for simultaneously copying two transmission holograms to a single hologram recording layer in accordance with the invention.

DETAILED DESCRIPTION OF THE DISCLOSURE

Figure 3:
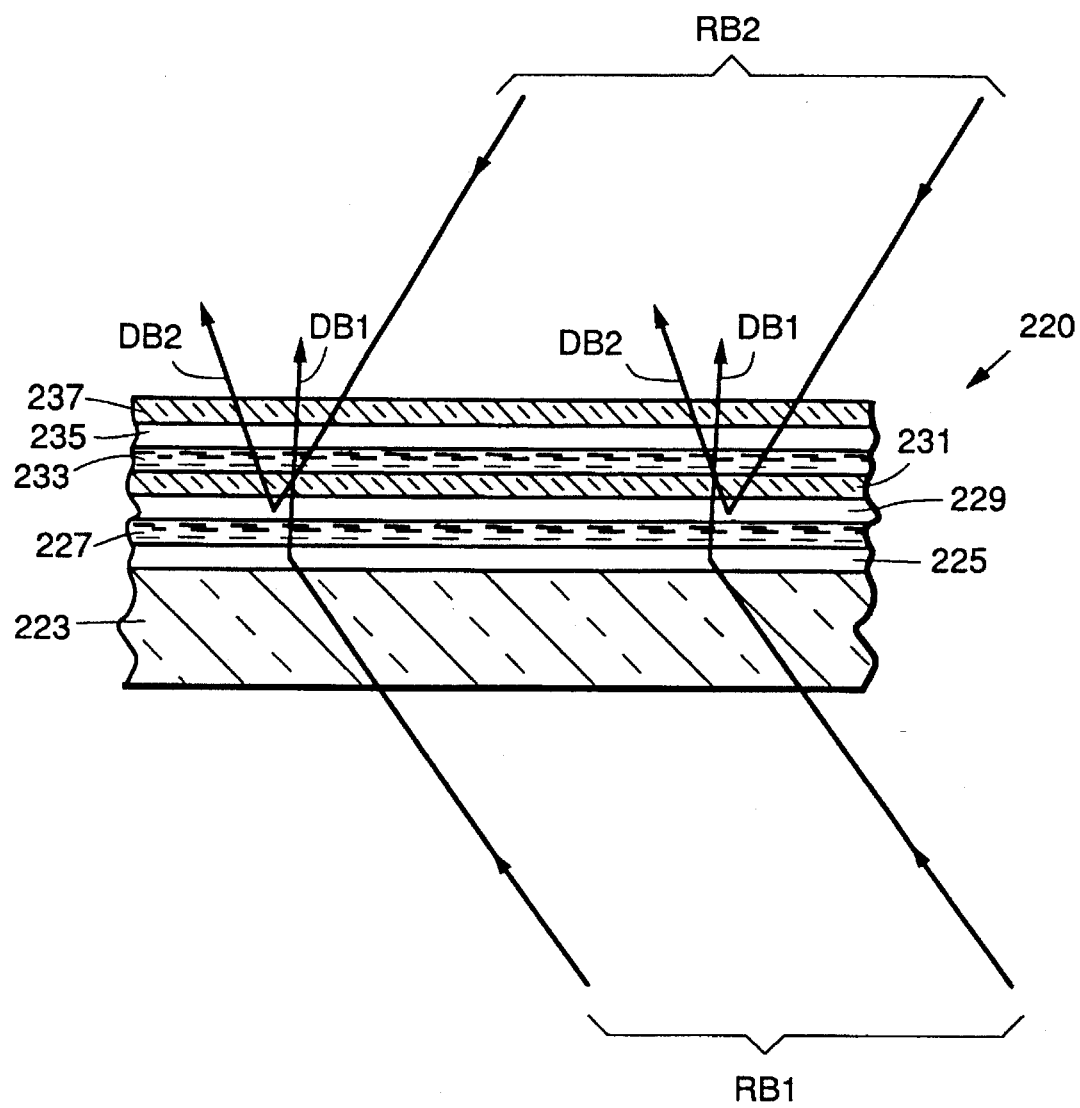
FIG. 3 schematically depicts a hologram copy system for simultaneously copying a transmission hologram and a reflection to a single hologram recording layer in accordance with the invention.

In the following detailed description and in the several figures of the drawing, like elements are identified with like reference numerals.

The subject invention is directed to a hologram copy system wherein first and second holograms are simultaneously copied in a hologram recording layer pursuant to respective reference and object beam pairs (i.e., each hologram copy is recorded pursuant to its own reference beam and object beam), wherein the reference beams are incoherent relative to each other, and the object beams are incoherent relative to each other. In particular, each hologram copy is constructed pursuant to interference of a reconstruction beam utilized for reconstruction of a master hologram and beam diffracted beam by such master hologram. In accordance with the invention, the reference beam and object beam for each hologram copy are coherently matched relative to each other across the hologram format, while the two beams for each undesired crosstalk hologram beam pair are coherently mismatched relative each other across the hologram format, wherein each crosstalk hologram beam pair is comprised of one beam from one hologram copy beam pair and one beam from the other hologram copy beam pair. In other words, the various beams are configured such that the components of each beam pair that produces a hologram copy interfere coherently while the components of each beam pair that produces an undesired crosstalk hologram interfere partially incoherently to form very low contrast fringes.

Referring now to FIG. 1, schematically depicted therein is a hologram copy system in accordance with the invention for simultaneously copying two reflection holograms to a single hologram recording layer. The exposure set up includes a first reconstruction beam RB1 that is directed to a hologram copying assembly 20, and is configured to reconstruct one of the two master reflection holograms to be copied. A second reconstruction beam RB2 is directed to the hologram copy assembly 20, and is configured to reconstruct the other master reflection hologram to be copied.

In accordance with the invention, the first and second reconstruction beams are incoherent relative to each other, for example by being of different wavelengths from separate lasers or the same laser, or by polarization mismatch or path length mismatch if from the same laser. Also, the two master holograms in the hologram copy assembly are sufficiently separated in Bragg angle or color such the master holograms are independent and light used to reconstruct one master hologram is not diffracted to any measurable extent by the other master hologram. Since the master holograms are independent, the final copy holograms can be independently tuned as to angle, color, and efficiency in accordance with known techniques.

The copy assembly 20 includes a transparent substrate 23 that supports on its top surface a first master reflection hologram 25, and has a beam dump coating 21, for example a layer of black matte paint, disposed on its lower surface. A second master reflection hologram 29 supported by a transparent substrate 31, which can be quite thin, is located above the first master reflection hologram 25 and is index matched thereto by an intervening transparent index matching layer 27. The transparent index matching layer 27 can comprise a transparent adhesive if the first and second master holograms are permanently bonded to each other, or it can comprise index matching fluid if the laminar assembly of the first and second master holograms is temporary. A hologram recording layer 35 supported by a transparent substrate 37 is located above the substrate 31 and is index matched thereto by an intervening index matching fluid layer 33. While not shown, a transparent protective substrate can be located between the index matching fluid layer 33 and the hologram recording layer 35 in accordance with conventional techniques.

In use, the first and second reconstruction beams pass through the transparent substrate 37, the hologram recording layer 35, the index matching fluid 33, and the transparent substrate 31. The reconstruction beam that is proper for the second master reflection hologram 29, shown as the second reconstruction beam RB2, is diffracted by the second master hologram 29, while the other reconstruction beam RB1 continues through the second master hologram 29 and the transparent index matching layer 27, and is diffracted by the first master hologram 25.

The beam DB1 diffracted by the first master hologram 25 is coherent with respect to the reconstruction beam by which it was produced, shown as the first reconstruction beam RB1, and propagates upwardly through the transparent index matching layer 27, the second master hologram 29, the transparent substrate 31, the index matching fluid 33, and the hologram recording layer 35. In particular as to polarization, the diffracted beam DB1 retains the polarization of the reconstruction beam RB1. Since the reconstruction beam RB1 and the diffracted beam from the first master hologram 25 are coherent, they interfere in the recording layer 35 to produce hologram fringes therein which are a copy of the hologram fringes of the first master hologram.

Similarly, the beam DB2 diffracted by the second master hologram 29 is coherent relative to the reconstruction beam by which it was produced, shown as the second reconstruction beam RB2, and propagates upwardly through the transparent substrate 31, the index matching fluid 33, and the hologram recording layer 35. In particular as to polarization, the diffracted beam DB2 retains the polarization of the reconstruction beam RB2. Since the reconstruction beam RB2 and the diffracted beam from the second master hologram 29 are coherent, they interfere in the recording layer 35 to produce hologram fringes therein which are a copy of the hologram fringes of the second master hologram.

Since the diffracted beams DB1, DB2 are respectively coherent with the respective reconstruction beams RB1, RB2 by which they were produced, and since the reconstruction beams RB1, RB2 are incoherent relative to each other, the diffracted beams DB1, DB2 are incoherent relative to each other. As a result of the incoherence of the first hologram copy constructing beam pair (RB1, DB1) with the respect to the second hologram copy constructing beam pair (RB2, DB2), the crosstalk beam pairs (RB1, DB2), (DB1, RB2), (DB1, DB2), and (RB1, RB2) that intersect in the hologram recording layer 35 do not interfere and thus do not form hologram fringes, since each crosstalk beam pair is comprised of incoherent beams. In other words, the reconstruction beam RB1 is incoherent with respect to the diffracted beam DB2; the diffracted beam DB1 is incoherent with respect to the reconstruction beam RB2; and so forth for all of the beam pairs other than the desired hologram copying beam pairs (RB1, DB1) and (RB2, DB2).

In the hologram copying assembly 20 of FIG. 1, the first and second master hologram layers 25, 29 can be replaced with a single master hologram layer that includes two master holograms constructed therein. In such implementation, the hologram layer containing the two master holograms would be disposed on the transparent substrate 23 and adjacent the hologram recording layer 35.

Referring now to FIG. 2, schematically depicted therein is a hologram copy system in accordance with the invention for simultaneously copying two transmission holograms to a single hologram recording layer. The exposure set up includes a first reconstruction beam RB1 that is directed to a hologram copying assembly 120, and is configured to reconstruct one of the two master transmission holograms to be copied. A second reconstruction beam RB2 that is incoherent relative to the first reconstruction beam RB1 is directed to the hologram copy assembly 120, and is configured to reconstruct the other master transmission hologram to be copied.

In accordance with the invention, the first and second reconstruction beams are incoherent relative to each other, for example by being of different wavelengths from separate lasers or the same laser, or by polarization mismatch or path length mismatch if from the same laser. Also, the two master holograms in the hologram copy assembly are sufficiently separated in Bragg angle or color such the master holograms are independent and light used to reconstruct one master hologram is not diffracted to any measurable extent by the other master hologram. Since the master holograms are independent, the final copy holograms can be independently tuned as to angle, color, and efficiency in accordance with known techniques.

The copy assembly 120 includes a transparent substrate 123 that supports on its top surface a first master transmission hologram 125. A second master transmission hologram 129 supported by a transparent substrate 131 is located above the first master transmission hologram 125 and is index matched thereto by an intervening transparent index matching layer 127. The transparent index matching layer 127 can comprise a transparent adhesive if the first and second master holograms are permanently bonded to each other, or it can comprise index matching fluid if the laminar assembly of the first and second master holograms is temporary. A hologram recording layer 135 supported by a transparent substrate 137 is located above the transparent substrate 131 and is index matched thereto by an intervening index matching fluid layer 133.

The exposure system of FIG. 2 is similar to the exposure system of FIG. 1, except that the reconstruction beams RB1, RB2 are incident on the hologram copying assembly 120 from below, and that the master holograms are transmission holograms.

In use, the first and second reconstruction beams pass through the substrate transparent 123, and the reconstruction beam that is proper for the first master transmission hologram 125, shown as the first reconstruction beam RB1, is diffracted by the first master transmission hologram 125, while the other reconstruction beam continues through the first master transmission hologram 125 and the transparent index matching layer 127, and is diffracted by the second master hologram 129.

The beam DB1 diffracted by the first master hologram 125 is coherent with respect to the reconstruction beam by which it was produced, shown as the first reconstruction beam RB1, and propagates upwardly through the transparent index matching layer 127, the second master hologram 129, the transparent substrate 131, the index matching fluid 133, and the hologram recording layer 135. In particular as to polarization, the diffracted beam DB1 retains the polarization of the reconstruction beam RB1. Since the reconstruction beam RB1 and the diffracted beam from the first master hologram 125 are coherent, they interfere in the recording layer 135 to produce hologram fringes therein which are a copy of the hologram fringes of the first master transmission hologram 125.

Similarly, the beam DB2 diffracted by the second master hologram 129 is coherent with respect to the reconstruction beam by which it was produced, shown as the second reconstruction beam RB2, and propagates upwardly through the transparent substrate 131, the index matching fluid 133, and the hologram recording layer 135. In particular as to polarization, the diffracted beam DB2 retains the polarization of the reconstruction beam RB2. Since the reconstruction beam RB2 and the diffracted beam from the second master hologram 129 are coherent, they interfere in the recording layer 135 to produce hologram fringes therein which are a copy of the hologram fringes of the second master hologram.

Since the diffracted beams DB1, DB2 are respectively coherent with the respective reconstruction beams RB1, RB2 by which they were produced, and since the reconstruction beams RB1, RB2 are incoherent relative to each other, the diffracted beams DB1, DB2 are incoherent relative to each other. Thus, as a result of the incoherence of the first hologram copy constructing beam pair (RB1, DB1) with the respect to the second hologram copy constructing beam pair (RB2, DB2), the crosstalk beam pairs (RB1, DB2), (DB1, RB2), (DB1, DB2), and (RB1, RB2) that intersect in the hologram recording layer 135 do not interfere and thus do not form hologram fringes, since each crosstalk beam pair is comprised of incoherent beams. In other words, the reconstruction beam RB1 is incoherent with respect to the diffracted beam DB2; the diffracted beam DB1 is incoherent with respect to the reconstruction beam RB2; and so forth for all of the beam pairs other than the desired hologram copying beam pairs (RB1, DB1) and (RB2, DB2).

In the hologram copying assembly 120 of FIG. 2, the first and second master transmission hologram layers 125, 129 can be replaced with a single master hologram layer that includes two master transmission holograms constructed therein. In such implementation, the hologram layer containing the two master holograms would be disposed on the transparent substrate 123 and adjacent the hologram recording layer 135.

Referring now to FIG. 3, schematically depicted therein is a hologram copy system in accordance with the invention for simultaneously copying a master reflection hologram and a master-transmission hologram to a single hologram recording layer. The exposure set up includes a first reconstruction beam RB1 that is directed toward the lower portion of a hologram copying assembly 220, and is configured to reconstruct the master transmission hologram to be copied. A second reconstruction beam RB2 is directed to the upper portion of the hologram copy assembly 220, and is configured to reconstruct the master reflection hologram to be copied.

In accordance with the invention, the first and second reconstruction beams are incoherent relative to each other, for example by being of different wavelengths from separate lasers or the same laser, or by polarization mismatch or path length mismatch if from the same laser. Also, the two master holograms in the hologram copy assembly are sufficiently separated in Bragg angle or color such the master holograms are independent and light used to reconstruct one master hologram is not diffracted to any measurable extent by the other master hologram. Since the master holograms are independent, the final copy holograms can be independently tuned as to angle, color, and efficiency in accordance with known techniques.

The copy assembly 220 includes a transparent substrate 223 that supports on its top surface a master transmission hologram 225. A master reflection hologram 229 supported by a transparent substrate 231 is located above the master transmission hologram 225 and is index matched thereto by an intervening transparent index matching layer 227. The transparent index matching layer 227 can comprise a transparent adhesive if the first and second master holograms are permanently bonded to each other, or it can comprise index matching fluid if the laminar assembly of the first and second master holograms is temporary. A hologram recording layer 235 supported by a transparent substrate 237 is located above the transparent substrate 231 and is index matched thereto by an intervening index matching fluid layer 233. It is noted that the positions of the master reflection hologram and the master transmission hologram can be interchanged.

In use, the first reconstruction beam passes through the transparent substrate 223 and is diffracted by the master transmission hologram 225. The second reconstruction beam passes through the transparent substrate 237, the hologram recording layer 235, the index matching fluid 233, the transparent substrate 231, and is diffracted by the master reflection hologram 229.

The beam DB1 diffracted by the master transmission hologram 225 is coherent with respect to the first reconstruction beam, and propagates upwardly through the transparent index matching layer 227, the master reflection hologram 229, the transparent substrate 231, the index matching fluid 233, and the hologram recording layer 235. In particular as to polarization, the diffracted beam DB1 retains the polarization of the reconstruction RB1. Since the reconstruction beam RB1 and the diffracted beam from the master transmission hologram 225 are coherent, they interfere in the recording layer 235 to produce hologram fringes therein which are a copy of the hologram fringes of the master transmission hologram 225.

The beam DB2 diffracted by the master reflection hologram 229 is coherent with respect to the reconstruction beam RB2 by which it was produced, and propagates upwardly through the transparent substrate 231, the index matching fluid 233, and the hologram recording layer 235. In particular as to polarization, the diffracted beam DB2 retains the polarization of the reconstruction beam RB2. Since the reconstruction beam RB2 and the diffracted beam from the master reflection hologram 229 are coherent, they interfere in the recording layer 235 to produce hologram fringes therein which are a copy of the hologram fringes of the master reflection hologram 229.

Since the diffracted beams DB1, DB2 are respectively coherent with the respective reconstruction beams RB1, RB2 by which they were produced, and since the reconstruction beams RB1, RB2 are incoherent relative to each other, the diffracted beams DB1, DB2 are incoherent relative to each other. Thus, as a result of the incoherence of the first hologram copy constructing beam pair (RB1, DB1) with the respect to the second hologram copy constructing beam pair (RB2, DB2), the crosstalk beam pairs (RB1, DB2), (DB1, RB2), (DB1, DB2), and (RB1, RB2) that intersect in the hologram recording layer 235 do not interfere and thus do not form hologram fringes, since each crosstalk beam pair is comprised of incoherent beams. In other words, the reconstruction beam RB1 is incoherent with respect to the diffracted beam DB2; the diffracted beam DB1 is incoherent with respect to the reconstruction beam RB2; and so forth for all of the beam pairs other than the desired hologram copying beam pairs (RB1, DB1) and (RB2, DB2).

In the hologram copying assembly 220 of FIG. 3, the master transmission hologram layer 225 and the master reflection hologram 229 can be replaced with a single master hologram layer that includes a master transmission hologram and a master reflection hologram constructed therein. In such implementation, the hologram layer containing the two master holograms would be disposed on the transparent substrate 223 and adjacent the hologram recording layer 235.

It should be noted that collimated reconstruction beams are shown in FIGS. 1–3 as an illustrative example, and that the reconstructions can be configured with other wavefronts such as a diverging wavefront, so as to emulate the reference beams with which the master holograms were constructed. Also, collimated diffracted beams are shown for ease of illustration, and it should be appreciated that the diffracted beams can be any configuration including a beam that forms an image of a complex diffuse three-dimensional object.

In implementing the invention with orthogonally polarized reconstruction beams, a possible configuration is one wherein the beams of one hologram copy forming beam pair are S polarized relative to the plane of the hologram recording film, in which case the beams of the other hologram copy forming beam pair would be P polarized relative to the plane of the hologram recording film. One reason for such configuration would to take advantage of the polarized output of a laser and utilize only one polarization rotating structure. It has been determined that the efficiency of a hologram copy recorded with beams of P polarization relative to the recording layer plane varies as the cosine of the included angle between the reconstruction beam and the diffracted beam in the recording layer, such that no hologram forming interference occurs with a 90 degree included angle. Accordingly, in implementations wherein the orthogonally polarized beams are of S and P polarizations relative to the plane of the recording layer, the hologram copy having the largest included angle between the reconstruction beam and the diffracted beam in the recording layer should be recorded with S polarization, and the included angle between the P polarized reconstruction beam and diffracted beam should be less than about 35 degrees, depending upon the particular application.

Loss in efficiency of the hologram copy constructed with P polarized light can be overcome to a certain extent by varying the relative exposure level between the two desired hologram forming beam pairs. The non-interfering portions of the P polarized beams are effective in reducing potential contrast of the hologram fringes, and thus increasing the exposure level of the P polarized interference would have a similar effect as increasing contrast. A balancing factor may be the higher reflection loss of the S polarized light, which is discussed further herein.

More generally, if the first and second polarized beams are not S and P polarized relative to the plane of the hologram recording layer, each desired hologram forming beam pair will lose contrast at high angles between beams. Depending upon the application, configuring the exposure for S and P polarized beams may be more appropriate, with appropriate consideration of the included angle for the P polarized beams and the higher reflection losses of the S polarized beams as discussed below.

In particular as to reflection loss, it may be appropriate to measure reflection loss at the air/substrate interface (before interference) as to most implementations of the invention, including those utilizing beams of S and P polarizations relative to the plane of the recording layer, since reflection loss is greater for S polarized light than for P polarized light at all angles greater than 15 degrees as measured relative to normal. By measuring reflection loss, exposure levels can be matched, both to obtain the proper beam ratio within a desired hologram beam pair and to obtain equivalent holograms with each set. For example, where it is desired that the two simultaneously constructed hologram copies have the same efficiency, they should have the same effective exposure level in the recording layer. This is probably best determined for the specific exposure system and hologram recording layer, since effective exposure is based on factors including absorption losses in the recording layer which vary with thickness and angle. Instead of reflectivity measurement, the efficiency of test hologram copies made pursuant to simultaneous copying in accordance with the invention can be measured, and appropriate exposure intensity adjustment can be made.

In the use of P polarized and S polarized reconstruction beams, each master hologram will generally have different diffraction efficiencies for P polarized light and for S polarized light, which will have to be taken into account if the two hologram copies are intended to have the same efficiency. For example a higher index modulation hologram may be used for the master hologram reconstructed with a P polarized reconstruction beam, so as to produce a corresponding hologram copy having substantially the same efficiency as the copy produced pursuant to the S polarized reconstruction beam. As stated previously, the difference in efficiencies of each of the master holograms for P polarized light and S polarized can also be compensated by controlling the relative exposure levels.

Further in regard to the use of P polarized and S polarized reconstruction beams, it may be desired to construct hologram copies having substantially the same efficiency from master holograms of different efficiencies. This can be achieved, for example, by controlling the P and S polarized components of the respective orthogonally polarized reconstruction beams and by controlling the relative intensities of the reconstruction beams (e.g., using P polarization for the more efficient master hologram, using a higher intensity reconstruction beam for the less efficient master hologram, and so forth). The efficiencies of the hologram copies can also be controlled by controlling the P and S polarized components of the respective orthogonally polarized reconstruction beams and by controlling the relative intensities of the reconstruction beams.

The disclosed simultaneous copy techniques are also advantageously utilized to produce a "beat" or Moire hologram which is of a longer wavelength such as infra-red, and is present as long as two holograms co-exist in the same hologram recording layer. Such longer wavelength holograms cannot be produced by direct exposure, and have been made in silver halide and DCG by sequential exposures, but not with photopolymer materials which are not amenable to sequential exposures. The sequential exposures in DCG required calculations and/or experimental iterations to compensate for variable shrinkage between exposures. Pursuant to the invention, "beat" holograms can be formed by simultaneously holograms in photopolymer materials, silver halide, and DCG, wherein the shrinkage compensation calculations or experimental iterations for DCG are eliminated.

The foregoing has been a disclosure of techniques for simultaneously copying two holograms in a single recording layer which reduces interaction between the two desired hologram forming beam pairs, and in photopolymer materials advantageously reduces surface distortion at the edges of adjacent or overlapping exposure areas. Simultaneous copying in accordance with the invention reduces the complexity and cost of multiple hologram optical elements, and produces very clean and efficient double hologram optical elements. The two holograms simultaneously copied in accordance with the invention can be configured to provide broader hologram bandwidths, or they can be unrelated.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram copy system comprising:

a first hologram layer containing a first hologram having Bragg angle and a color associated therewith;

a second hologram layer laminarly adjacent said first hologram and containing a second hologram having a Bragg angle and a color associated therewith, wherein said first hologram and said second hologram are sufficiently separated in Bragg angle or color such that light diffracted by one of the holograms is not substantially diffracted by the other hologram;

a first reconstruction beam for illuminating the first hologram which produces a first diffracted beam that is coherent relative to said first reconstruction beam and is of the same polarization as said first reconstruction beam;

a second reconstruction beam that is orthogonally polarized relative to said first reconstruction beam for illuminating the second hologram which produces a second diffracted beam that is coherent relative to said second reconstruction beam and is of the same polarization as said second reconstruction beam; and a single hologram recording layer responsive to said first and second reconstruction beams and said first and second diffracted beams, whereby said first reconstruction beam and said first diffracted beam interfere in said single hologram recording layer to construct a copy of the first hologram, and said second reconstruction beam and said second diffracted beam interfere in said single hologram recording layer to construct a copy of the second hologram.

2. The hologram exposure system of claim 1 wherein the first and second holograms are reflection holograms.

3. The hologram exposure system of claim 1 wherein the first and second holograms are transmission holograms.

4. The hologram exposure system of claim 1 wherein the first hologram is a transmission hologram and the second hologram is a reflection hologram.

5. A hologram copy system comprising:

a hologram layer containing first and second holograms, each hologram having a respective Bragg angle and a respective color associated therewith, wherein said first hologram and said second hologram are sufficiently separated in Bragg angle or color such that light diffracted by one of the holograms is not substantially diffracted by the other hologram;

a first reconstruction beam for illuminating the first hologram which produces a first diffracted beam that is coherent relative to said first reconstruction beam and is of the same polarization as said first reconstruction beam;

a second reconstruction beam that is orthogonally polarized relative to said first reconstruction beam for illuminating the second hologram which produces a second diffracted beam that is coherent relative to said second reconstruction beam and is of the same polarization as said second reconstruction beam; and a single hologram recording layer responsive to said first and second reconstruction beams and said first and second diffracted beams, whereby said first reconstruction beam and said first diffracted beam interfere in said single hologram recording layer to construct a copy of the first hologram, and said second reconstruction beam and said second diffracted beam interfere in said single hologram recording layer to construct a copy of the second hologram.

6. The hologram exposure system of claim 5 wherein the first and second holograms are reflection holograms.

7. The hologram exposure system of claim 5 wherein the first and second holograms are transmission holograms.

8. The hologram exposure system of claim 5 wherein the first hologram is a transmission hologram and the second hologram is a reflection hologram.

* * * * *